Sept. 5, 1972 F. R. AGNEW ET AL 3,689,224

CHEMICAL CONTAMINANT DETECTION SAMPLER

Filed April 13, 1966 2 Sheets-Sheet 1

CHEMICAL CONTAMINANT DETECTION SAMPLER
Filed April 13, 1966 2 Sheets-Sheet 2
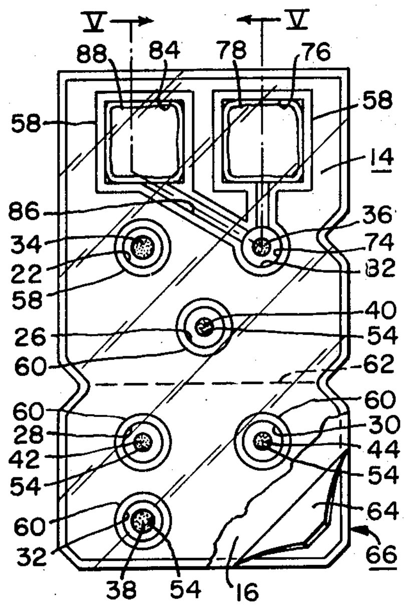
FIG. 4.
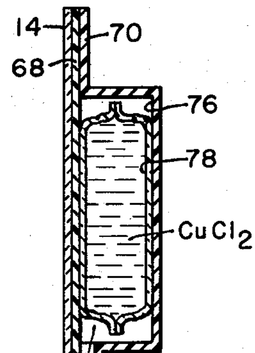
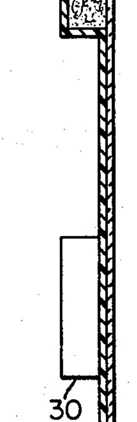
FIG. 5.
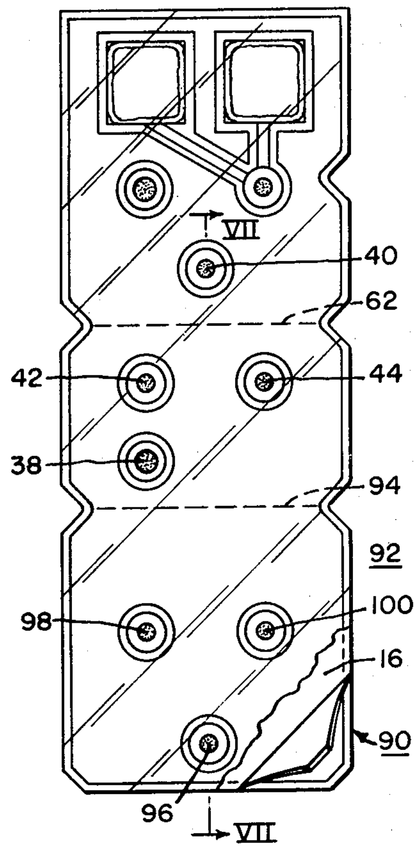
FIG. 6.
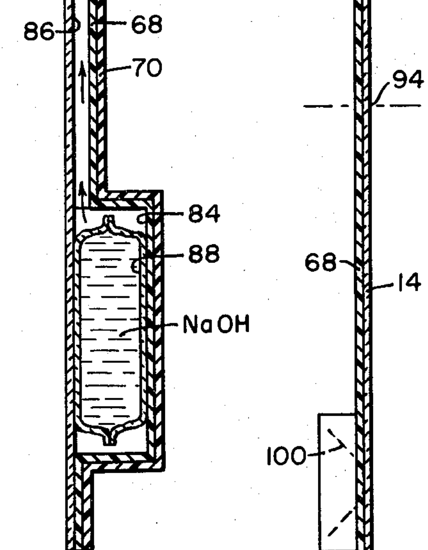
FIG. 7.
FIG. 8.

3,689,224
CHEMICAL CONTAMINANT DETECTION SAMPLER

Frank R. Agnew, Penn Hills Township, Pittsburgh, Francis P. Byrne, Franklin Township, Murrysville, Thomas D. Kaczmarek, Penn Hills Township, Pittsburgh, Owen H. Kriege, Franklin Township, Export, Gordon C. Gainer, Penn Hills Township, Pittsburgh, and Russell M. Luck, Monroeville, Pa., assignors to Westinghouse Electric Corporation, Pittsburgh, Pa.

Filed Apr. 13, 1966, Ser. No. 542,365
Int. Cl. G01n *31/00, 33/00*
U.S. Cl. 23—253 TP 12 Claims

ABSTRACT OF THE DISCLOSURE

A disposable sampler for testing for the presence of chemical contaminants in fluids comprising a relatively flat laminated package including a base sheet, a retainer sheet, and a cover sheet, the sheets being composed of relatively impermeable materials, at least one of the base and retainer sheets being formed to provide at least one pocket and at least one recess and to provide an open channel extending between the recess and the one pocket, a sorptive pad disposed in the recess, a rupturable sack filled with a liquid reagent disposed in the pocket, and the retainer sheet covering the pocket and channel and recess and having an aperture registered with and above the sorptive pad so as to enable a liquid to be tested to contact the sorptive pad, and the cover sheet sealed over the retainer sheet to seal the opening therein until the cover sheet is removed for conducting a test.

This invention relates to a device for rapidly testing for the presence of contaminants in air, fluids and on solids. More particularly, the invention pertains to a device for quickly identifying the possible existence and the type of a contaminant such as involved in chemical warfare agents.

The techniques used for the detection of contaminants including chemical warfare agents, in the atmosphere, water, and on the surface of solid objects, heretofore involved the use of paraphernalia such as bottles, test tubes, and measuring means such as burettes and eyedroppers, together with appropriate reagents for use in testing for the presence of a contaminant or agent. Such techniques were somewhat impractical for many situations because a person skilled in the art of their use was usually required. Another disadvantage was that a test by such techniques usually required from 2 to 3 minutes for an analysis of several suspected contaminants. Moreover, in prior testing devices a separate sampler of air and an individual test is required for each contaminant tested, that is, several tests could not be conducted simultaneously.

Associated with the foregoing was the difficulty of performing the tests because precise amounts of reagents were required for detecting the presence of some agents. Further, a particular reagent may be caustic or otherwise potentially harmful and awkward or cumbersome to handle.

While various types of devices and techniques have been developed for detecting the presence of contaminants including chemical warfare agents, they have been objectionable for one or more of the above reasons including the failure to eliminate the direct handling of caustic or potentially harmful reagents, the lack of simplicity in obtaining a sample, and the inability to make multiple tests for different contaminants simultaneously.

In accordance with the present invention it has been found that the foregoing problems and difficulties may be overcome by a unitary self-contained sampler which is adapted to eliminate the awkwardness and much of the "guess work" entailed in prior techniques, and which provides for the simultaneous testing of a group of contaminants known to be used in chemical warfare. The sampler device provides for spaced test positions within which a suitable test reagent may be placed and to which a contaminant may be brought to react with the reagent and yield a test result.

Accordingly, it is a general object of this invention to provide a chemical contaminant detection sampler which is simple and readily manipulated for rapidly testing the atmosphere, water or solid surfaces for the presence of one or more chemical contaminants.

It is another object of this invention to provide a chemical contaminant detection sampler which may be operated by an average person, in which reagents that are used for making tests are stored until the sampler is ready for use and without deterioration by atmospheric constituents or contaminants.

It is another object of this invention to provide a chemical contaminant detection sampler which is free from the deleterious effects of potentially harmful reagents that may be used in the sampler and that may be compatible with and not destructive of the reagents contained therein.

Finally, it is an object of this invention to accomplish the foregoing objects and desiderata in a simple and effective manner.

Briefly, the device of the present invention accomplishes the foregoing objects by providing a sampler for testing the presence of chemical contaminants in fluids or air including a relatively flat laminated package having a formed base sheet, a retainer sheet, and a cover sheet, the sheets being composed of relatively impermeable materials, the base sheet having a pocket, a recess and channel extending between the recess and pocket, a sorptive pad disposed in the pocket, a rupturable sack filled with a liquid reagent disposed in the pocket, the retainer sheet applied to the base sheet and covering the pocket and channel, there being an opening in the retainer sheet above the sorptive pad so as to enable a fluid to be tested to contact the sorptive pad, and the cover sheet being detachably secured to the retainer sheet to seal the opening until the cover sheet is removed for conducting a test. Furthermore, the sampler may be provided with a plurality of pockets each containing a sorptive pad for use with different reagents to test for more than one contaminating agent at a time, and a plurality of recesses with sorptive pads, connected by channels to one or more pockets, and, in some cases, associated with recesses in which a pad or porous solid member having a reagent reactive to indicate a specific contaminant. Thus a plurality of separate tests may be conducted simultaneously.

More specifically, the invention is directed to an elongated, relatively flat, laminated package including at least one formed base sheet, a retainer sheet, and a cover sheet, the sheets being composed of reagent impermeable materials; (1) the formed base sheet having a plurality of spaced recesses and pockets, some of the recesses containing one of a pad of sorptive material and of a rigid porous object, the other of the recesses containing the other of the pad and porous objects, a body of fluid reagent in each of the pockets, the base sheet having a channel extending between each of the pockets and at least one of the recesses, and manually rupturable sealing means for confining each reagent in its respective pocket; (2) the retainer sheet having a plurality of spaced apertures disposed in a pattern similar to that of the recesses of the base sheet, the apertures being smaller than the recesses, the retainer sheet being secured to the base sheet in a fluid-tight manner and with the apertures being registered with the recesses, the retainer sheet having a peripheral portion around each aperture extending over a peripheral portion of each pad and porous object; and (3) the cover sheet being detachably secured to the retainer sheet in a fluid-tight manner; whereby the laminated package with the cover sheet in place provides a readily usable sampler for detecting chemical contaminants, and whereby the package with the cover sheet detached provides a sampler suitable for substantially simultaneous detection of a plurality of contaminants in air, liquids, or on the surface of solids.

For a better understanding of the nature and objects of this invention reference is made to the drawings, in which:

FIG. 4 is a top plan view of a sampler as used for detecting the presence of chemical contaminants in water and showing only a portion of a peelable cover sheet intact;

FIG. 5 is an enlarged vertical sectional view taken on the line V—V of FIG. 4;

FIG. 6 is a plan view of another embodiment of the invention;

FIG. 7 is an enlarged vertical sectional view taken on the line VII—VII of FIG. 6; and FIG. 8 is an enlarged sectional view showing the manner in which an end portion of the sampler of FIG. 6 is folded to bring test reagents into contact with related test spots.

Figure 1:
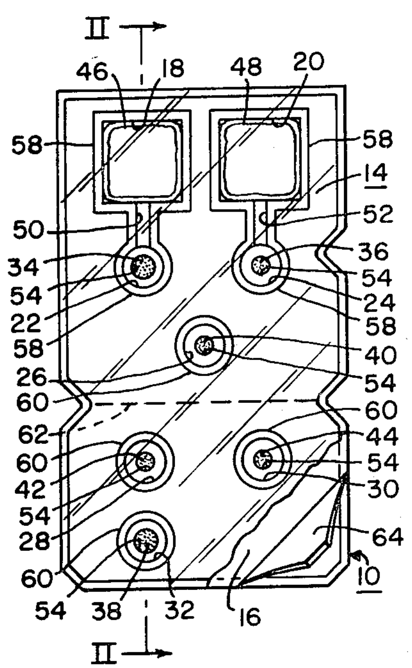
FIG. 1 is a top plan view (in substantially actual size) of an air sampler for detecting chemical contaminants in air and showing only a portion of a peelable cover sheet intact.
Figure 2:
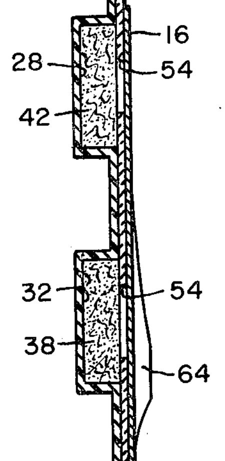
FIG. 2 is an enlarged longitudinal sectional view taken on the lines II—II of FIG. 1.

In FIGS. 1 and 2 is shown a sampler 10 in accordance with the invention, comprising an elongated, relatively flat, laminated package including a base sheet 12, a retainer sheet 14, and a cover sheet 16. Though all of the sheets 12, 14, and 16 are substantially coextensive, only a portion of the cover sheet 16 is shown to clearly illustrate the top side of the sampler when the cover sheet is removed. The sampler 10 includes a plurality of spaced pockets 18 and 20 as well as a plurality of spaced recesses 22, 24, 26, 28, 30, and 32 formed in the base sheet 12.

The sampler 10 is used for carrying out a multiplicity of tests which may be made separately or simultaneously, and the several recesses 22 to 32 are each adapted for testing for separate contaminants. For that purpose the recesses 22, 24, 26, 28, 30 and 32 are filled with pads 34, 36, 38, 40, 42, and 44 respectively, whose nature will be detailed subsequently. The recesses 22 to 32 are generally referred to as "test spots."

As shown in FIGS. 1 and 2 a sack, 46 and 48, is disposed in each pocket 18 and 20, respectively. A channel 50 extends between the pocket 18 and the recess 22. Likewise, a channel 52 extends between pocket 20 and the recess 24.

For construction purposes as well as convenient handling of the sampler 10 the base sheet 12 is preferably a molded member provided with the pockets 18 and 20, the recesses 22 through 32, and the channels 50 and 52. As shown in FIG. 2 the sack 46 containing a reagent is contained within the pocket 18 where it is retained in place by the retainer sheet 14. The retainer sheet 14 is also provided with a plurality of apertures 54 which register preferably with the centers of the several recesses 22–32. The adjoining surfaces of the sheets 12 and 14 preferably of a resinous plastic are sealed together as by heat sealing and preferably provide a sealed peripheral portion 56 as well as sealed portions 58 extending around the pockets, channels, and recesses which communicate with each other. Likewise, sealed portions 60 surround each recess 26–32. The sealed portions 56, 58, and 60 are fluid-tight and are conveniently produced by the application of heat and pressure from a die to the sheets 12 and 14.

The cover sheet 16 is detachably secured to the upper side of the retainer sheet 14 in a fluid-tight manner. The cover sheet 16 is composed of an impervious material such as metal foil or any other material that is flexible and impermeable to fluids. A preferred material for sheet 16 is aluminum foil. The sheet 16 is secured by the application of heat and pressure such as by a hot platen, an energy seal, or a radio frequency seal. The seal is sufficient to provide a fluid-tight joint which prevents deterioration of the contents of the sampler 10 during storage, but permits ready removal of the sheet 16 such as by manual peeling away when the sampler is to be used.

The base sheet 12 and the retainer sheet 14, the latter being transparent, are preferably composed of the same or similar material that is inert to most chemical reagents and particularly those used in detecting the contaminants for which the sampler is provided. The sheets may be formed of a synthetic plastic film, for instance of a fluorinated polymer such as monochlorotrifluoroethylene polymer, and polytetrafluoroethylene, and are sold under the trademarks Kel-F, Teflon (FEP), Aclar. During their preparation these polymers are preferably treated to render them substantially free of low molecular weight components such as monomers, dimers and trimers since these may either set up an interfering reaction similar to a positive test, or may react with the reagents and render them unreactive with the contaminants being subsequently tested. Such interfering reactions would normally occur during storage of the sampler prior to its use.

The sheets 12, 14 and 16 may have a thickness ranging from 2 to 20 mils with a preferred range of 4 to 10 mils and an optimum thickness being from about 5 to 7 mils. The thickness may depend somewhat with the polymer material being used. The sheets should be impermeable, have good flexibility, and have sealing qualities so that the base sheet 12 and the retainer sheet 14 may be tightly bonded to each other. The sheets 12 and 14 are readily molded to provide the pockets, recesses, and channels therein. If the sheets are excessively thick, they cannot be readily heat sealed together in the region of the sealed portions 56, 58, and 60.

The pads 34, 36, and 38 are composed of a sorptive material which is coated or impregnated with a chemical reagent. The pads may be composed, for example, of cellulose paper, asbestos fibers, felt of synthetic fibers, such as nylon and cotton wadding, cardboard, and molecular sieves. Some of the pads are preferably composed of glass fiber filter type paper coated or impregnated with silica gel which latter has sufficient sorptive properties for absorbing the contaminant agent to be tested, and which will absorb the reagent with which the contaminant agent is reacted to complete the test. Other pads are of porous fritted glass to receive a test crayon mark.

The pads 34 and 36 are used to detect contaminant agents which require the addition of certain reagents. For that reason the recesses 22 and 24 in which the pads are located are connected by channels 50 and 52 to the pockets 18 and 20, respectively, in which suitable reagents are confined within manually rupturable sealing means such as sacks 46 and 48. The sacks 46 and 48 are composed of plastic sheets such as monochlorotrifluoroethylene having a thickness of from 5 to 15 mils and preferably of about 10 mils. The sacks or pouches are filled with suitable reagent liquids and are heat sealed along the edges to form a liquid tight container.

When employing the sampler 10 for testing for the contaminant agents in the atmosphere, the cover sheet 16 is first removed by peeling it off the top surface of the retainer sheet 14 by a tear tab 64, as shown in FIG. 2. When the cover sheet 16 is removed, the several pads 34 to 44 are immediately exposed to the atmosphere through the apertures 54 in retainer sheet 14. As evident from the drawing, the several apertures 54 are smaller than the pads 34–44 so that the peripheral portions of the retainer sheet around each aperture 54 overlap the pads and hold them in place within the recesses.

In addition to the foregoing the smaller size of the apertures 54 has another advantage. When the cover sheet 16 is removed and the pads are exposed to the atmosphere, the center of each pad immediately under the apertures 54 has a greater exposure to the contaminant agents in the atmosphere than the portions of the pads under the peripheral portion of the cover sheet around each aperture. Accordingly, a slight change of color is easier to detect by comparing the change in the pad portion under the aperture 54 with the surrounding portion of the pad which may remain colorless, thus giving a so-called "fried egg" effect.

Figure 3:
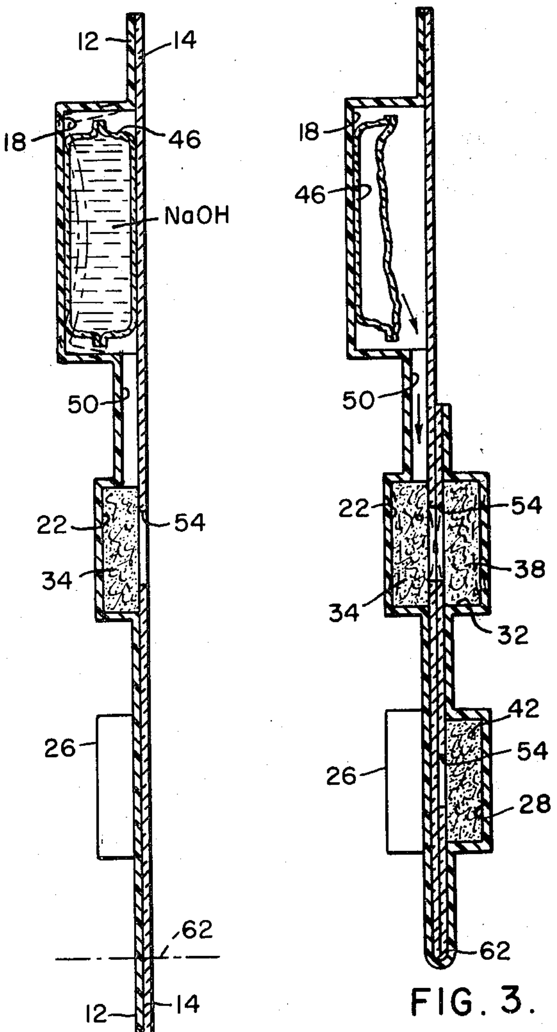
FIG. 3 is an enlarged longitudinal sectional view showing the manner in which an end portion of the sampler of FIG. 1 is folded over an intermediate portion to bring certain test spots in contact with each other.

In using the pad 34 for the detection of a nerve agent in the air or water, it is previously impregnated with an enzyme such as a cholinesterase serum which may be horse cholinesterase or bovine cholinesterase, the latter being preferred, a protein such as bovine serum albumin and a suitable buffer to maintain a pH in the 7 to 8 range. The pad 38 is used in conjunction with the pad 34 and is impregnated with dye-forming ester such as indoxyl acetate, and with an antioxidant such as a mixture of potassium or sodium ferro and ferricyanides. The first phase of the test is the moistening of the pad 34 by rupturing the sack 46 which contains water by manually squeezing the sheets 12 and 14 until the sack bursts and forces water through the channel 50 to the pad. After exposure to the suspected air or water, the second phase of the test involves folding of the sampler 10 on the dotted fold line 62 which is midway between the pads 34 and 38 so that the apertures 54 are brought into register with each other as shown in FIG. 3. The pads 34 and 38 are then pressed into contact with each other within the apertures 54 and squeezed together between the thumb and the forefinger of the user. When the ester and the enzyme are brought together, a color change indicates the absence of nerve agent in the atmosphere, while no change of color indicates the presence of nerve agent.

The pad 36 may be used to detect the presence of mustard gas in the air, by impregnating it with $\gamma$, 4-nitrobenzyl pyridine (more commonly known as DB–3) plus mercuric cyanide $Hg(CN)_2$, which are contained within silica gel retatined on glass fibers within the pad. When the cover sheet 16 is removed, the pad 36 is immediately exposed to the atmosphere through the aperture 54. Thereafter the sack 48, containing aqueous sodium hydroxide (NaOH) solution, is ruptured and squeezed to saturate the pad 36 with the sodium hydroxide solution. If the color of the pad 34 remains unchanged, no mustard agent, bis ($\beta$ chlorethyl) sulfide, is present in the air. But if the pad develops a characteristic blue color, the test is positive.

The pads 40, 42, and 44 may be used for the detection of arsenic compounds, cyanide, and phosgene, respectively, in the atmosphere. For that purpose, the pads 40, 42, and 44 are composed of a relatively hard substance such as fritted glass which is porous and which is used in conjunction with a test crayon or chalk of a composition well known in the art for testing for arsenic compounds, phosgene, and cyanide. Such test crayons have for some time been used by the U.S. Department of Defense for testing for arsenic compounds, cyanide, and phosgene. Accordingly, when the pad 40 is marked with its corresponding test crayon through the aperture 54, if arsenic (Lewisite) is present in the air the pad will change color indicating the presence of the contaminant in the air. Otherwise if the pad remains unchanged in color, the test is negative.

Likewise, the pad 42 (when marked with an appropriate test crayon) will change color if cyanide is present. It will remain unchanged if cyanide is absent. In a similar manner the pad 44 marked with a test crayon will change color if phosgene is present in the air, otherwise, it will remain unchanged, indicating a negative test.

Another embodiment of the invention is shown in FIGS. 4 and 5 in which a sampler 66 for testing the presence of contaminant agents in water or other liquids is provided. Inasmuch as the sampler 66 is used to test for the presence of contaminant agents in water in a manner similar to the detection of agents described for testing in air as used by the sampler 10, all of the members and parts which are similar to those in the sampler 10 as described in FIGS. 1, 2 and 3 are similarly identified for the sampler 66 as shown in FIGS. 4 to 8. Thus, the sampler 66 includes a retainer sheet 14 and a cover sheet 16. In addition, the sampler 66 includes a pair of base sheets 68 and 70, (FIG. 5) instead of the single base sheet 12 as used in the air sampler.

The pad 34 for detecting a nerve agent in water, for instance, is moistened when the sampler 66 is dipped in the water to be tested and therefore does not require a water sack such as the sack 46 in the sampler 10. However, since the catalyst $Hg(CN)_2$ incorporated with DB–3 in the air sampler is water soluble, it is necessary to apply heat to the pad 36 before the test is completed. Also the reactive rate is considerably reduced by the chemical action of the water. For that purpose a disk 72 of aluminum metal (FIG. 5) is secured in a recess 74 provided by the base sheet 70 below and on the opposite side of the base sheet 68 where the pad 36 is located. The base sheet 70 also provides a pocket 76 for containing a sack 78 of an aqueous solution of copper chloride ($CuCl_2$) which pocket communicates by a channel 80 with the recess 74. The channel, recess, and pocket may be molded in the base sheet 70.

In addition the base sheet 68 provides a recess 82, a pocket 84 and an intercommunicating channel 86 which are molded into the base sheet. The recess 84 contains a sack 88 containing an aqueous solution of sodium hydroxide (8–10% NaOH).

Both base sheets 68 and 70 are secured to each other and to the retainer sheet 14 by the application of pressure during a heat-weld-cooling cycle. To obtain the seals, various methods of applying heat between the adjacent sheets may be used. Among these are a hot plate, dielectric energy radio frequency heating, or from an electrical current or ultrasonic energy source.

When the cover sheet 16 is removed appropriate test crayons are applied to the several pads 40, 42, and 44, respectively, through the apertures 54. The sampler 66 is then immersed in the water to be tested so that all of the pads are moistened. The sack 78 is then squeezed between the thumb and forefinger. The copper chloride solution passes through the channel 80 to the recess 74 where it reacts vigorously with the aluminum disk 72 to generate heat and heats the pad 36 in the recess 82. After a brief reaction time the sack 88 is ruptured and the solution of sodium hydroxide is forced through the channel 86 to the pad 36. If the pad 36 remains uncolored the test is negative, but if it turns to a bluish color there is an indication of the contaminant mustard agent in the water (a positive test).

Another embodiment of the invention is shown in FIGS. 6, 7, tnd 8 in which a sample 90, which may be substantially the same as samplers 10 and 66, is provided with an additional end portion 92 which is divided from the main body portion of the sampler 90 by a visible fold line 94. The end portion 92 has three portions 96, 98, and 100 each with a different test crayon or chalk mark on a fritted glass pad. When the end portion 92 is folded on the line 94 (FIG. 8), the separate portions 96, 98, and 100 of test crayon are brought into registry with teh pads or spots 40, 42 and 44. Each portion 96, 98, and 100 contains an appropriate chemical for testing for an arsenic compound, cyanide, and phosgene. Where the sampler is not provided with a portion 92 having test crayon portions 96, 98, and 100, the user of the sampler must carry the appropriate test crayons on his person or attached in a sealed container attached to the sampler for separate application to the pads 40, 42 and 44.

When the test for contaminants in air or water is completed the sampler 10 or 66 may be disposed of.

Either sampler 10 or 66 may be used to test for the presence of contaminant agent on solids by removing the cover sheet 16 and pressing the several pads 34 to 44 against the surface of the object to be tested and then proceeding with the test in the manner described for testing air or water.

Moreover, the cover sheet may be divided into smaller detachable portions covering only one or two of the test pads to permit the testing of one or two agents at a time.

Accordingly, the device of the present invention provides an expedient and positive means for detecting the possible presence of a contaminant agent such as chemical warfare agents. Multiple tests may be made simultaneously and expediently without the necessity of handling caustic chemicals or other potentially harmful agents as have been necessary with prior tests procedures. Finally, the device provides for the detection of contaminant agents in air, water, or on a solid surface without the use of cumbersome equipment and by persons other than skilled technicians. Also the tester may be used to test industrial atmospheres for sulfur bearing gases, carbon monoxide and the like, or for testing for chemical contaminants such as wastes from factories or mines.

It is understood that the above specification and drawings are merely exemplary and not in limitation of the invention.

What is claimed is:

1. A sampler for testing for the presence of chemical contaminants in fluids comprising a relatively flat laminated package comprising a base sheet, a retainer sheet, and a cover sheet, the sheets being composed of relatively impermeable materials, at least one of the base and retainer sheets being formed to provide at least one pocket and at least one recess and to provide an open channel extending between the recess and at least one pocket, a sorptive pad disposed in the recess, a rupturable sack filled with a liquid reagent disposed in the pocket, the retainer sheet applied to the base sheet and covering the pocket and channel, the retainer sheet covering the recess and having an aperture registered with and above the sorptive pad so as to enable a fluid to be tested to contact the sorptive pad, and the cover sheet sealed over the retainer sheet to seal the opening therein until the cover sheet is removed for conducting a test.

2. The sampler construction of claim 1 in which the recess, pocket, and channel are molded portions of the base sheet which is composed of one of a material selected from a group consisting of polyperfluorinated plastic and a chlorofluorinated plastic.

3. The sampler construction of claim 1 in which the retainer sheet is composed of a polyperfluorinated plastic.

4. The sampler construction of claim 1 in which the base and retainer sheets have a thickness ranging from about 5 to 20 mils.

5. The sampler construction of claim 1 in which the manually rupturable sealing means includes a sealed reagent-filled pouch composed of polyperfluorinated plastic having a thickness of from about 9 to 11 mils.

6. The sampler construction of claim 1 in which the pads of sorptive material is composed of an element selected from a group consisting of cellulose paper, felt, synthetic fiber, asbestos, molecular sieve, fritted glass, glass fiber filter paper and woven fabric impregnated with gelatinous silica.

7. The sampler construction of claim 1 in which the package is foldable upon itself to bring at least one recess into registration with at least one other recess whereby reagents of the registered recess are mixed to accomplish a desired reaction.

8. The sampler construction of claim 1 in which the base sheet is provided with a plurality of pockets for testing for the presence of more than one contaminating agent.

9. The sampler construction of claim 1 in which the base sheet has a plurality of spaced recesses and pockets, at least some of the recesses containing a pad of sorptive material, other of the recesses containing the other of the pad, a body of fluid reagent in each of the pockets, the base sheet having a channel extending between each of the pockets and at least one of the recesses, manually rupturable sealing means for confining each reagent in its respective pocket; the retainer sheet having a plurality of spaced apertures disposed in a pattern similar to that of the recesses, the apertures being smaller than the recesses, the retainer sheet being secured to the base sheet in a fluid-tight manner and with the apertures being registered with the recesses, the retainer sheet having a peripheral portion around each aperture extending over a peripheral portion of each pad; the cover sheet being detachably secured to the retainer sheet in a fluid-tight manner; whereby the laminated package with the cover sheet in place provides a readily usable sampler for detecting chemical contaminants, and whereby the package with the cover sheet detached provides a sampler for substantially simultaneous detection of a plurality of contaminants in air, liquids, or on the surface of solids.

10. The sampler construction of claim 1 in which there are at least two recesses and at least two pockets provided between the base and the retainer sheets, and in which at least one recess communicates with at least one pocket.

11. The sampler construction of claim 1 in which one recess communicates with one pocket and another recess communicates with another pocket.

12. The sampler construction of claim 1 in which one recess communicates with two pockets.

References Cited

UNITED STATES PATENTS

| | | | |
|---|---|---|---|
| 2,561,339 | 7/1951 | Chediak | 23—253 |
| 2,995,425 | 8/1961 | Fuhrmann | 23—253 |
| 2,998,306 | 8/1961 | Huyck et al. | 23—254 |
| 3,002,385 | 10/1961 | Wahl et al. | 23—253 X |
| 3,022,141 | 2/1962 | Crosskopt | 23—254 |
| 3,036,894 | 5/1962 | Forestiere | 23—253 X |
| 3,112,999 | 12/1963 | Grosskopt | 23—254 |
| 3,311,454 | 3/1967 | Kemeny et al. | 23—254 |

CARL D. QUARFORTH, Primary Examiner

F. M. GITTES, Assistant Examiner

U.S. Cl. X.R.

23—254 R; 195—54, 99